UNITED STATES PATENT OFFICE.

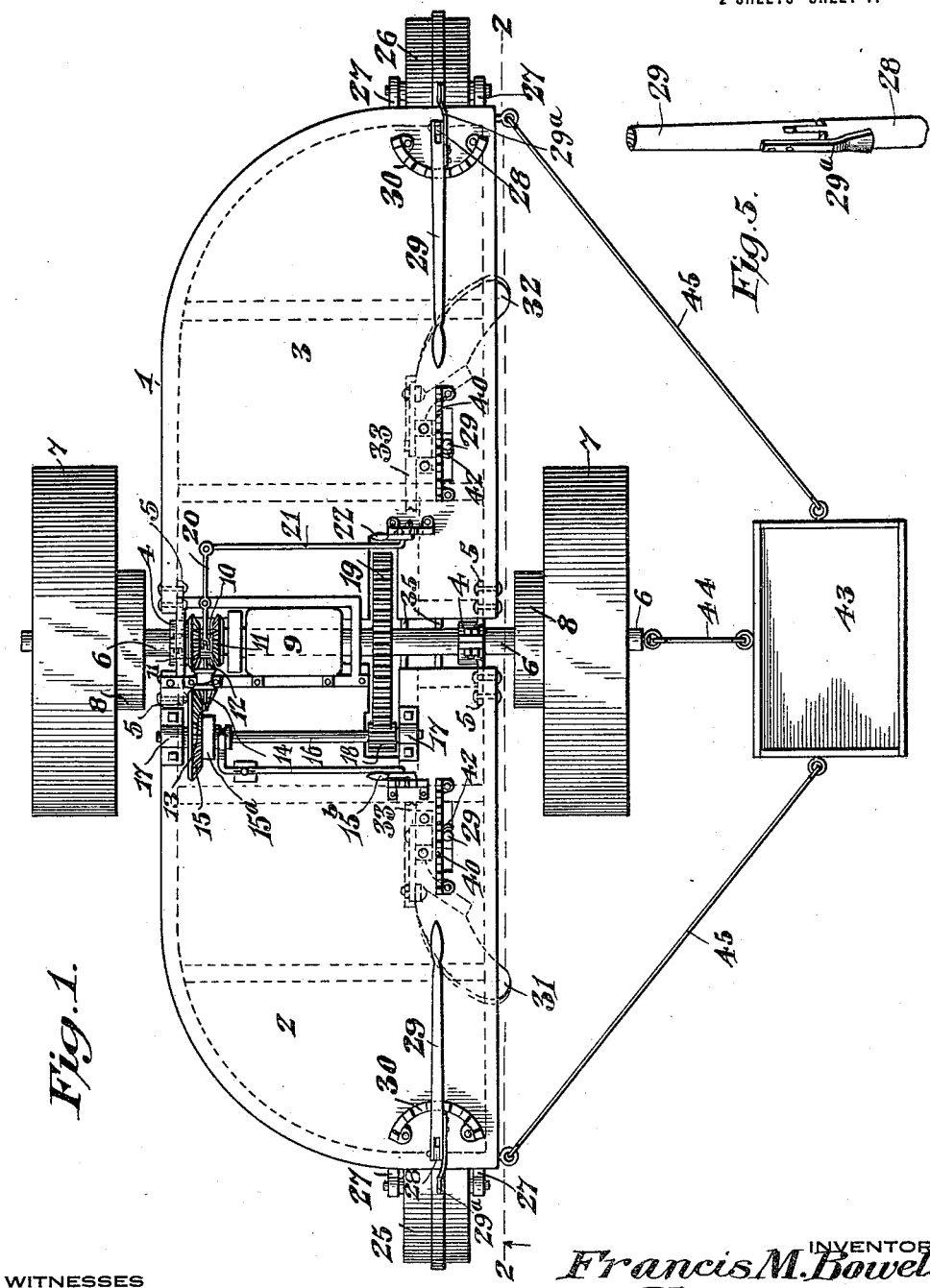

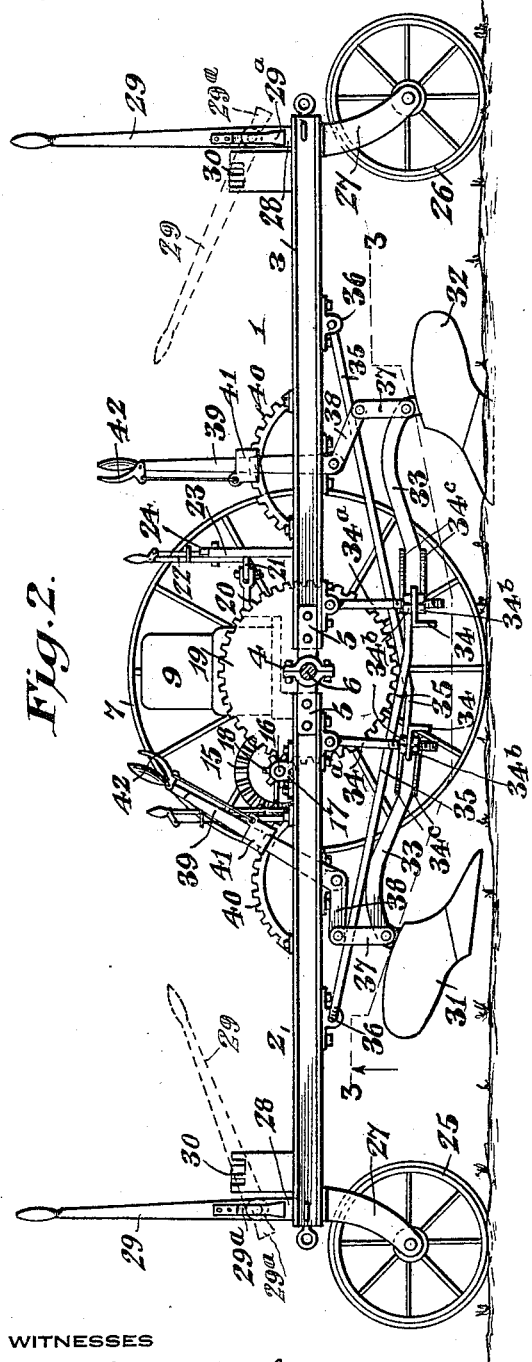

FRANCIS MARION BOWELL, OF LAPORTE, INDIANA.

TRACTOR-PLOW.

1,272,905.

Specification of Letters Patent.

Patented July 16, 1918.

Application filed July 26, 1917. Serial No. 182,899.

*To all whom it may concern:*

Be it known that I, FRANCIS M. BOWELL, a citizen of the United States, residing at Laporte, in the county of Laporte and State of Indiana, have invented a new and useful Tractor-Plow, of which the following is a specification.

This invention has reference to tractor plows and its object is to provide a self propelling plow of the nonreversible type which will readily accommodate itself to uneven ground and by means of which a straight furrow will be plowed.

In accordance with the invention there is provided a suitable frame with plows arranged in line one with the other in the direction of travel of the machine, but so mounted that only one plow is in service at a time. The frame of the machine is so constructed as to be hinged intermediately of its length with the plows on opposite sides of the axis of the hinge, and at opposite ends of the frame there are mounted steering wheels each capable of adjustment independently of the other. The machine carries a power unit which may be in the form of an explosion engine.

The invention will be best understood from a consideration of the following description taken in connection with the accompanying drawings showing a practical embodiment of the invention, with the understanding however that the machine as shown may be changed and modified in various ways so long as such changes and modifications come within the scope of the appended claims.

In the drawings:—

Figure 1 is a plan view of a tractor plow embodying the invention.

Fig. 2 is a side elevation with the drive shaft in section on the line 2—2 of Fig. 1.

Fig. 3 is a section on the line 3—3 of Fig. 2.

Fig. 4 is a perspective view of a plow beam support.

Fig. 5 is a detail view showing a portion of one of the shearing levers.

Referring to the drawings there is shown a main frame 1 comprising two sections 2, 3, respectively, joined at adjacent ends by split collars 4 connected to the frames by straps 5, or otherwise, and encircling a shaft 6, which latter, as will hereinafter appear, constitutes both a power shaft and an axle.

The shaft or axle 6 carries traction wheels 7 at the ends, beyond the sides of the frame 1, and to facilitate movements the shaft or axle 6 is connected to the respective traction wheels through differential gearing, simply indicated by casings 8, since it is common to employ differential gearing between traction wheels and the drive shaft or axle thereof, and hence it is not deemed necessary to illustrate such gearing in detail.

Mounted on section 2 of the main frame 1 is a power unit 9 shown more or less conventionally as an explosion engine. Since many types of such engines may be used for the purposes, no attempt is made to illustrate any particular form of explosion engine. On the shaft of the engine 9 is a clutch member 10 movable into engagement with either one of two opposed bevel wheels 11, which are loosely mounted, but both meshing with a bevel pinion 12 on one end of the shaft 13 carrying another bevel pinion 14 on its other end, the shaft 13 being suitably mounted on the frame of the engine 9 or on any other suitable support. The pinion 14 is in mesh with a bevel gear wheel 15 loose on one end of a countershaft 16 having journal bearings 17 on one of the sections of the main frame, say, the section 2. The wheel 15 is connected to the shaft 16 by a clutch 15$^a$ controlled by a lever 15$^b$, or otherwise. The countershaft 16 carries a pinion 18 meshing with a gear wheel 19 on the shaft or axle 6.

The clutch member 10 is under the control of one end of a lever 20, which, at the other end, is connected by a link 21 to an operating lever 22 carried by a rack 23 and provided with a usual thumb-latch 24. The lever 22 provides a convenient means for connecting the engine to the drive shaft 6, when the cluch 15$^a$ is open, so that the shaft 6 may be driven in one direction or the other without reversing the engine. In this way, power is applied to the traction wheels 7 for driving the tractor in either direction in accordance with the will of the operator, in a manner similar to the operation of the reverse on an automobile or tractor. It will be understood that since explosion engines usually run at relatively high speed, the gearing connections between the engine 9 and shaft 6 are properly proportioned to produce a desirable reduced speed of rotation to the traction wheels.

At opposite ends of the main frame 1 are steering wheels 25, 26, respectively, each mounted in a yoke 27 provided with a stem 28 journaled in and rising through a respective frame section 2 or 3, as the case may be. Hinged to the upper end of each stem 28 is a manipulating arm 29 provided with a spring finger 29ª for holding it in a normally upright position as shown in full lines in Fig. 2, from which position it may be moved on its hinge to the depressed dotted line position shown in Fig. 2 to engage in any one of a series of notches in a rack frame 30 upstanding from the platform 1. In Fig. 1 the lever arms 29 are shown in full lines in the depressed position. The steering wheels 25 are located near opposite ends of the main frame so that they may be set in alinement one with the other.

The machine is provided with opposed plows 31, 32, respectively, each provided with plow beams 33. These plows may be taken as indicative of any suitable plows for the purpose and are so arranged as to act in opposite directions. Furthermore, while only single plows are shown, it will be understood that gangs of plows may be employed. Each plow beam 33 at the end remote from the plow share is pivotally mounted on a yoke member 34 carried by legs 34ª pendently hung from a corresponding one of the two sections 2 and 3 of the main frame 1. The legs 34ª are threaded for the reception of nuts 34ᵇ, whereby the yoke member 34 may be adjusted up and down at either or both ends. Furthermore the yoke member 34 is connected to one end of a link 35, the other end of which is pivoted in a bracket 36 on the under side of the section of the main frame remote from that carrying the member 34 to which the plow is also connected. Hounds 34ᶜ are carried by each yoke member 34 above and below the respective plow beam, guiding and bracing the latter. Each plow is supported by a link 37 from the short arm 38 of an angle lever 39 pivotally mounted on a corresponding section of the main frame and rising through the main frame to a point above the latter. Each lever 39 is movable along a rack segment 40 and is held to the segment in any adjusted position by a latch device 41 under the control of a thumb piece 42 carried by the lever.

Each lever 39 provides means for elevating or depressing the respective plow and holding it in either position. The yokes 34 and the links 35 impart a desirable flexibility to the plow supports to permit them to conform to the flexibility of the main frame due to the hinge connection of the main frame sections through the shaft 6, which constitutes a hinge pintle.

When plowing with the tractor plow of the invention the wheels 25, 26 are so set as to maintain the plow structure in a straight line of travel and one of the plows is elevated while the other is depressed. With the engine running and coupled up to the traction wheels to rotate the latter in a proper direction, the active plow is given a forward movement and engages the ground back of the traction wheels in a position to produce a furrow in which the steering wheel, in trailing relation to the active plow runs. One of the traction wheels is upon the unplowed ground and the other traction wheel is so located as to be to one side of the furrow being produced and in the old furrow.

When the end of the field is approached by, say, twenty or thirty feet, the steering wheel, then constituting the main steering wheel is adjusted to direct the machine to one side of the line of the furrow produced, thus shifting the machine to an extent measured by the width of the furrow. Then the plow first active is raised and the other plow is depressed. The clutch 15ª is released and the gearing between the engine and the drive shaft is reversed, whereupon, when the clutch 15ª is again coupled, the machine starts back over the field toward the other end and by a proper adjustment of the steering wheels proceeds toward the first end of the field but this time with the other steering wheel traveling in the newly produced furrow. The result is that the machine is guided, in the reverse travel toward the other end of the field, in most part automatically. The operations described are repeated at each end of the field and the furrows are produced one after the other without any wastage at the ends of the field and without the necessity of turning the machine about.

By hinging or otherwise making the frame flexible between its ends and preferably intermediately of its length, the machine readily conforms to all inequalities of the ground over which it travels and the plows automatically maintain the depth of their cut without material variation. Furthermore the active plow tends to hold the steering wheel behind it and the traction wheel in front of it in firm engagement with the ground thereby preventing slippage.

In order to smooth off the plowed ground as the machine travels over it a drag 43 is spaced by a link 44 from the appropriate end of the axle 6 and other links 45 connect the respective ends of the drag to the corresponding ends of the main frame 1, the several links giving the needed flexibility.

What is claimed is:—

1. A tractor plow having a main frame formed of sections hinged together at their meeting ends, plow members carried by the separate sections of the frame, a power unit on the frame, and traction wheels carrying the frame and provided with an axle constituting a pintle for the hinges and connected to the power unit for actuation thereby.

2. A tractor plow provided with a main frame composed of sections hinged together, plows individual to the sections and each connected to the other section, a power unit mounted on the main frame, a power shaft or axle constituting a pivotal connection for the sections of the main frame and having means for coupling it to the power unit, and traction wheels on the shaft for driving the tractor plow.

3. A tractor plow comprising a main frame made up of two sections with an intermediate power shaft constituting a hinge pivotally connecting the two sections, a plow on each section with the plows reversed and having means for raising and lowering them, whereby one plow or the other may be made active in accordance with the direction of travel of the machine, tractor wheels on the shaft for supporting and driving the tractor plow, a power unit for driving the shaft extending lengthwise of and over the latter and steering wheels at the ends of the tractor plow.

4. A tractor plow structure provided with a main frame, opposed plows carried by the main frame, means for raising and lowering the share ends of the plows, and a suspension means for the forward end of the beam of each plow comprising a yoke with pivoted suspension legs and a link extending from the yoke toward and connected to that end portion of the main frame remote from the plow.

5. A tractor plow structure provided with a main frame, opposed plows carried by the main frame, means for raising and lowering the share ends of the plows, and a suspension means for the forward end of the beam of each plow comprising a yoke member with pivoted suspension legs adjustably connected to the yoke member for raising and lowering either or both ends of the yoke member, and a link extending from the yoke member toward and connected to that end portion of the frame remote from the plow.

6. A tractor plow structure provided with a main frame composed of two sections hinged together intermediate of the length of the frame, driving means on the frame having a power shaft constituting a hinge pintle for the two sections of the main frame, opposed plows carried by the two sections of the main frame, and suspending means for the forward end of the beam of each plow comprising a pivoted yoke on one side of the power shaft, and a link connected to the yoke and extending beneath the power shaft to the other side thereof and there in turn pivoted to the corresponding section of the main frame.

7. A tractor plow structure provided with a main frame composed of two sections hinged together intermediate of the length of the frame, driving means on the frame having a power shaft constituting a hinge pintle for the two sections of the main frame, opposed plows carried by the two sections of the main frame, and suspending means for the forward end of the beam of each plow comprising a pivoted yoke on one side of the power shaft, and a link connected to the yoke and extending beneath the power shaft to the other side thereof and there in turn pivoted to the corresponding section of the main frame, each yoke being provided with hounds above and below the plow beam.

In testimony that I claim the foregoing as my own, I have hereto affixed my signature in the presence of two witnesses.

FRANCIS MARION BOWELL.

Witnesses:
LEMUEL DARROW,
MABEL E. BROOKS.

Copies of this patent may be obtained for five cents each, by addressing the "Commissioner of Patents, Washington, D. C."